US010569966B2

(12) United States Patent
Smit et al.

(10) Patent No.: US 10,569,966 B2
(45) Date of Patent: Feb. 25, 2020

(54) DEVICE AND METHOD CONFIGURED TO CONTROL ROTATION OF AN OBJECT ON A CARRIER

(71) Applicant: QIMAROX PATENTEN B.V., Harderwijk (NL)

(72) Inventors: Martijn Smit, Diepeveen (NL); Yoran Hessel Van Urk, Nunspeet (NL)

(73) Assignee: QIMAROX PATENTEN B.V., Harderwijk (NL)

( * ) Notice: Subject to any disclaimer, the term of this patent is extended or adjusted under 35 U.S.C. 154(b) by 0 days.

(21) Appl. No.: 16/465,221

(22) PCT Filed: Dec. 5, 2017

(86) PCT No.: PCT/NL2017/050811
§ 371 (c)(1),
(2) Date: May 30, 2019

(87) PCT Pub. No.: WO2018/106104
PCT Pub. Date: Jun. 14, 2018

(65) Prior Publication Data
US 2019/0344971 A1 Nov. 14, 2019

(30) Foreign Application Priority Data

Dec. 5, 2016 (NL) ..................................... 2017923

(51) Int. Cl.
*B65G 43/08* (2006.01)
*B65G 47/31* (2006.01)
*B65G 47/244* (2006.01)
(52) U.S. Cl.
CPC ......... *B65G 43/08* (2013.01); *B65G 47/2445* (2013.01); *B65G 47/31* (2013.01)
(58) Field of Classification Search
CPC ..... B65G 43/08; B65G 47/31; B65G 47/2445
(Continued)

(56) References Cited

U.S. PATENT DOCUMENTS 4,147,930 A * 4/1979 Browne .................... B07C 5/02
198/394
4,435,837 A * 3/1984 Abernathy ............. B25J 9/1697
112/275
(Continued)

FOREIGN PATENT DOCUMENTS

DE 102015105317 A1 10/2016
EP 1205410 A1 5/2002
(Continued)

OTHER PUBLICATIONS

International Search Report and Written Opinion for the International Patent Application No. PCT/NL2017/050811, dated Mar. 9, 2018, 37 pages.
(Continued)

*Primary Examiner* — Douglas A Hess

(57) ABSTRACT

A device includes a carrier to carry and transport rectangular objects in a transport direction; a meter to measure a dimension of the object and/or measure a spacing between successive objects; and a controller to rotate at least one object and/or adjust said spacing. The meter can measure an outer dimension of a side surface of the object. The controller can align the side surface in line with the transport direction. A method includes: providing at least one object; measuring a dimension of the object and/or measuring a spacing between successive objects; and rotating at least one object around an upright axis line and/or adjusting a spacing between successive objects. Measuring the dimension includes measuring an outer dimension of a side surface of the object. Rotating the at least one object around the upright axis line includes aligning the side surface in line with a transport direction of said object.

20 Claims, 8 Drawing Sheets

(58) Field of Classification Search
USPC ...... 198/419.2, 456, 502.2, 502.3, 575, 577, 198/617
See application file for complete search history.

(56) References Cited

U.S. PATENT DOCUMENTS

| | | | | |
|---|---|---|---|---|
| 4,915,209 | A * | 4/1990 | Canziani | B65G 43/08 198/357 |
| 5,125,303 | A * | 6/1992 | Hoyland | B26D 7/18 53/517 |
| 5,484,049 | A * | 1/1996 | Huang | B65G 43/08 198/460.3 |
| 6,002,125 | A * | 12/1999 | Schubert | B25J 9/1697 250/223 R |
| 6,508,351 | B1 * | 1/2003 | Christoffersen | B65B 35/58 198/394 |
| 6,812,426 | B1 * | 11/2004 | Kotowski | B65G 43/10 198/460.1 |
| 7,552,814 | B1 * | 6/2009 | Thomas | B65G 47/82 198/346.1 |
| 7,810,536 | B2 * | 10/2010 | Bassi | B65B 35/56 156/350 |
| 7,975,830 | B2 * | 7/2011 | Bacher | B65G 47/31 198/461.2 |
| 8,060,243 | B2 * | 11/2011 | Ogawa | B65G 43/08 198/358 |
| 8,061,506 | B2 * | 11/2011 | Schafer | B65G 43/08 198/444 |
| 8,205,738 | B1 | 6/2012 | Fourney | |
| 8,636,137 | B2 * | 1/2014 | Weber | B65G 47/24 198/456 |
| 9,361,590 | B2 * | 6/2016 | Noda | G06N 20/00 |
| 9,399,557 | B1 * | 7/2016 | Mishra | B65G 43/00 |
| 9,433,994 | B2 * | 9/2016 | Matsuyama | B21D 43/105 |
| 9,440,799 | B1 * | 9/2016 | Wang | B65G 43/02 |
| 9,555,977 | B2 * | 1/2017 | Combs | B65G 43/10 |
| 9,599,459 | B1 * | 3/2017 | Janicki | B65G 43/08 |
| 9,718,622 | B2 * | 8/2017 | Smith | B65G 57/18 |
| 9,779,507 | B2 * | 10/2017 | Braun | G01B 11/26 |
| 2007/0074954 | A1 | 4/2007 | Neville | |
| 2007/0205083 | A1 | 9/2007 | Smalley et al. | |
| 2012/0228085 | A1 | 9/2012 | Sjogren et al. | |

FOREIGN PATENT DOCUMENTS

| | | |
|---|---|---|
| EP | 2792623 A1 | 10/2014 |
| JP | H0524625 A | 2/1993 |

OTHER PUBLICATIONS

International Preliminary Report of Patentability for the International Patent Application No. PCT/NL2017/050811, dated Feb. 18, 2019, 9 pages.

* cited by examiner

DEVICE AND METHOD CONFIGURED TO CONTROL ROTATION OF AN OBJECT ON A CARRIER

The present invention relates to a device and a method configured to control rotation of an object on a carrier.

Palletizing infeed systems are used to customize pallet layer forming of products, by positioning and/or orientating products on a carrier. Orientating products on the carrier relates to rotation of said object on said carrier.

Products are understood to mean, among other things, (cardboard) boxes and trays, but also filled bags. In the application, such products are mainly referred to as objects.

To position and/or orient such products, palletizing infeed systems may use one or more of guided tracks, roller belts or robotics.

It is an object for most palletizing infeed systems to provide improved flexibility for customized pallet layer forming of the most varied products, and at the highest possible throughput rates. Moreover, in order to ensure proper formation, it is also an object to precisely arrange the varied products at the high throughput rate. As the throughput rate increases, this often reduces the accuracy of positioning and/or orientating of the products.

It is important that independent objects have sufficient space that allow them to be individually manipulated, i.e. positioned and/or oriented. The available space around an object may be adversely influenced by a too limited spacing between successive objects. Although a too limited spacing may already occur between successive objects that are substantially aligned relative to each other, a misaligned object may even further diminish the available spacing. In a worst case misalignment situation of a rectangular object, the diagonal of said object may be aligned instead of one of the sides of the object. When successive objects are misaligned, the spacing is even further reduced.

US 2007/205083, which forms the closest prior art, discloses a method and apparatus for reducing the likelihood of an object becoming jammed in a conveyor system. A dimension of the object is measured, and rotated if this dimension is greater than a threshold value. The device of US 2007/205083 only roughly and inaccurately aligns objects. It suffices if the corrected orientation of the objects allows them to pass a critical passage in the conveyor system, e.g. enter an inspection unit of a luggage handling system at an airport. Contrary to palletizing infeed systems, the alignment is not a critical factor in luggage handling. Relative to US 2007/205083, at least the characterizing features of independent claim 1 are novel.

EP 2 792 623 discloses a device and method for forming a predefined formation on a conveyor belt. A gripper repositions the objects in the desired formation. In order to grip an object, the gripper itself requires the objects to be provided in an aligned manner. Consequently, the gripper of EP 2 792 623 re-aligns the objects, instead of aligning objects that may be provided in a random orientation.

An object of the present invention is to provide a device, that is improved relative to the prior art and wherein at least one of the above stated problems is obviated.

Said object is achieved with the device according to claim 1 of the present invention.

Moreover, said object is achieved with the method according to claim 11 of the present invention.

The device comprises a meter configured to measure a dimension of the object relative to at least one direction. With such a meter it is possible to measure a dimension of the object relative to at least one direction and rotating the object around an upright axis line. Based on these measurements, it is possible to determine a variation of the dimension of the object. The device comprises a controller configured to determine this variation of the dimension of the object, said controller further being configured to control rotation of the object to align said object in a desired orientation based on the determined variation of the dimension of the object. With the meter, it is furthermore possible to measure a spacing between successive objects.

Substantially rectangular objects are to be interpreted broad in the teaching of this invention, and may also encompass e.g. bag-like objects (such as bags filled with sand, potting soil, fertilizer or food for animals). For the invention, an object is interpreted as being substantially rectangular if it defines an orientation with a side thereof, that may be aligned in line with a transport direction of said object.

If the alignment of a first object is known, and preferably substantially in line with a transport direction of said object, the spacing between this first object with known alignment may be used by said meter to determine whether or not a successive object is correctly aligned or may need adjustment. Furthermore, as described in the introduction, it is also important that independent objects have sufficient space that allow them to be individually manipulated, i.e. positioned and/or oriented.

For many practical applications, and especially for palletizing infeed systems, accurate alignment is a critical factor. Accurate alignment of an object relative to e.g. a transport direction thereof, requires that one or more than one absolute outer dimension of the object is determined. To the contrary, the prior art device of US 2007/205083 measures a frontal surface of the object to assess whether or not it may pass through a critical passage. If a measured object is not perfectly aligned, which is generally the case with luggage in a luggage handling system, the frontal surface is defined by a sectional inner dimension of the object. The invention requires the meter to measure an outer dimension of a side surface of the object, allowing the controller to align the side surface of said object substantially in line with the transport direction.

Preferred embodiments are the subject of the dependent claims.

In the following description preferred embodiments of the present invention are further elucidated with reference to the drawing, in which.

Figure 1:
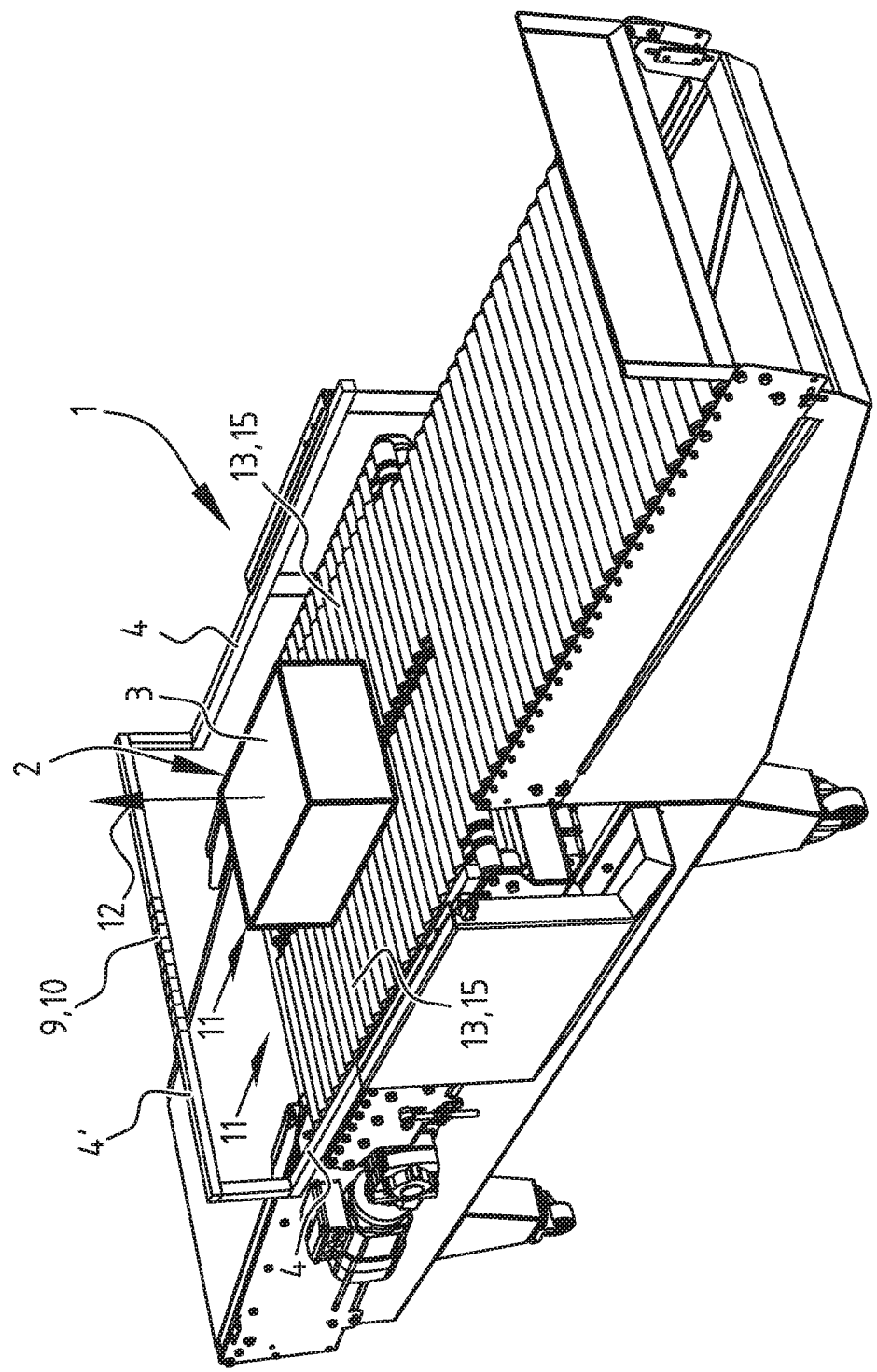
FIG. 1 is a perspective view of a device according to the invention.

The device 1 shown in FIGS. 1 and 2 comprises a carrier 2 to subsequently carry objects 3, and a meter 4 configured to measure a dimension 5 of the object 3 relative to at least one direction 6. The device 1 further comprises a controller 7 configured to determine a variation of the dimension 5 of the object 3 and configured to control rotation of the object 3 to align said object 3 in a desired orientation based on the determined variation of the dimension 5 of the object 3.

The meter 4 is configured to measure an outer dimension of a side surface of the object 3, and the controller 7 is configured to align the side surface of said object 3 substantially in line with a transport direction of said object 3. Based on the outer dimension of a side surface of the object 3, the controller 7 can accurately align said object 3 in a desired orientation.

The carrier 2 is configured to subsequently rotate the objects 3 on the carrier 2, and the controller 7 is configured to control rotation of the object 3 on the carrier 2. In this way, the device 1 is capable of successively orientating and positioning objects 3 to form a customized pallet layer 8, as shown in FIG. 2.

The meter 4 comprises one or more than one detector 9. The meter 4 comprises at least one detector 9 from a group comprising at least one of a proximity sensor, a photo sensor, a video sensor, an ultrasonic sensor. As shown in FIGS. 3-8, the meter 4 comprises an array of sensors 10.

In the figures, the measurement direction 6 is mainly from the side, both straight (elucidated in FIG. 4) and/or oblique (elucidated in FIGS. 5 and 6), but the measurement direction 6 may correspond to at least one of a side, top, frontal, rear or oblique view.

Figure 2:
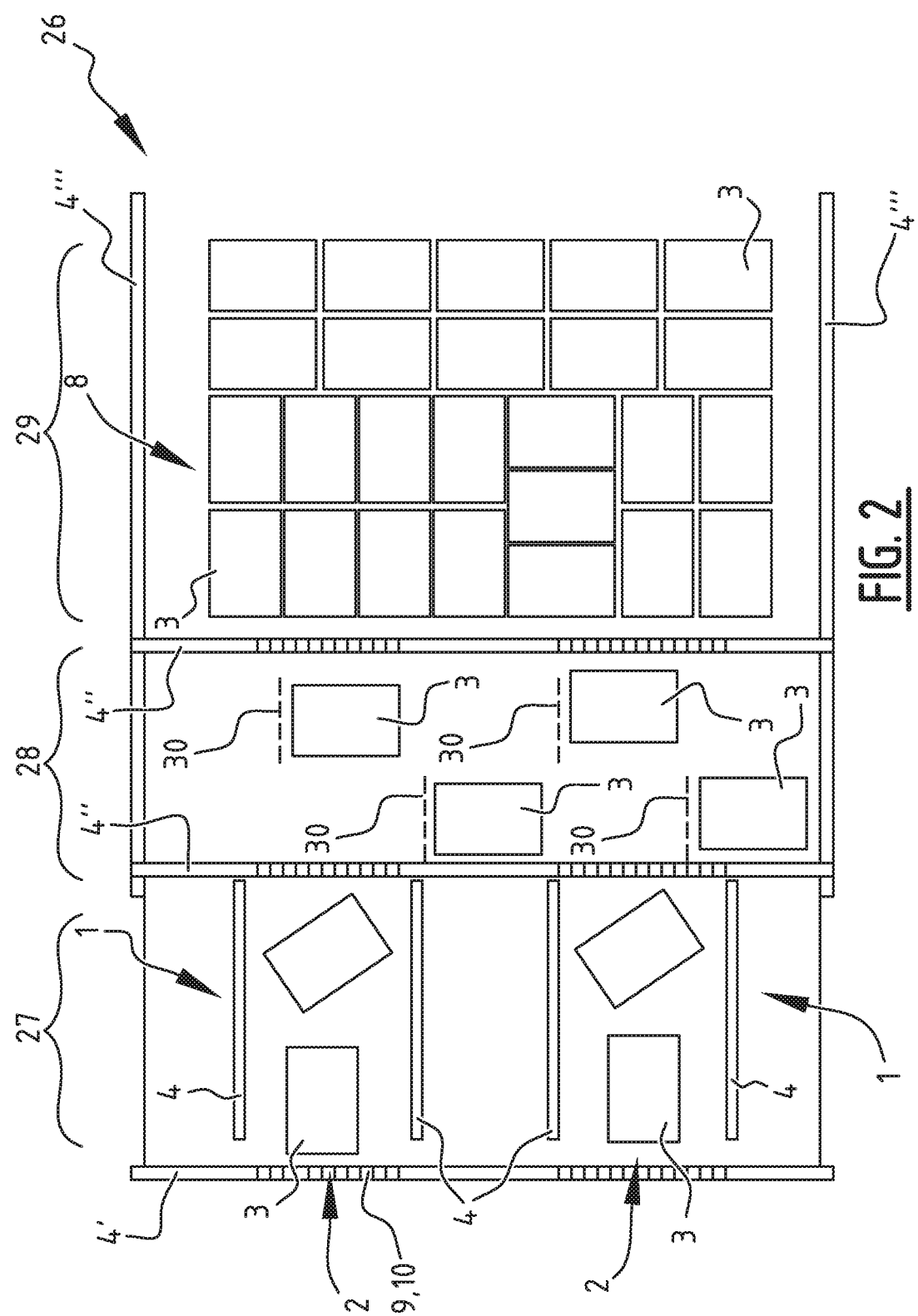
FIG. 2 is a schematic top view of the application of a device according to the invention in a palletizing infeed system.
Figure 3:
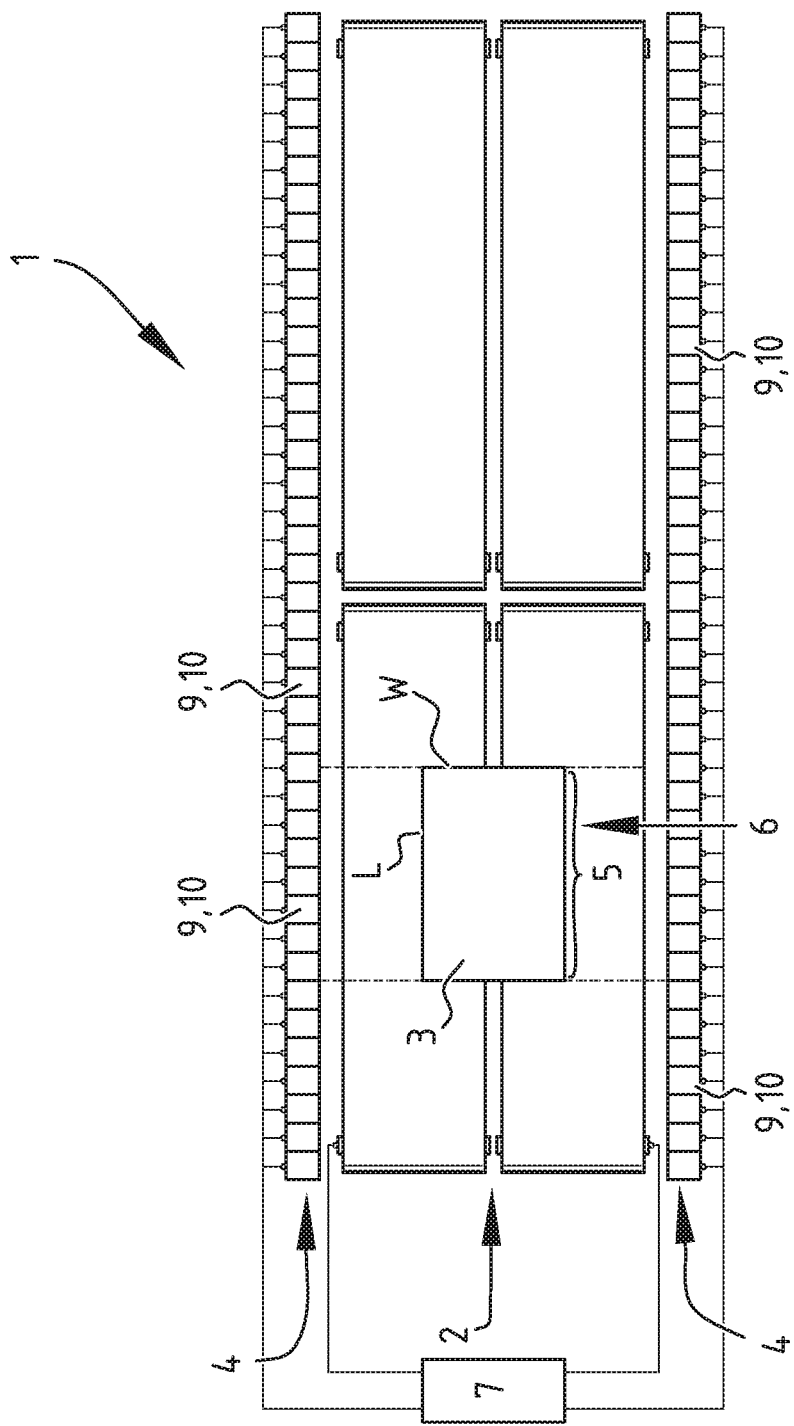
FIG. 3 is a schematic top view of the device according to FIG. 1.

The palletizing infeed system 26 shown in FIG. 2 comprises a turning part 27, a formation part 28 and a layer buffer 29. In the turning part 27, objects 3 are orientated and/or positioned. For this orientating and positioning, a meter 4 is used as described below in more detail.

Figure 6:
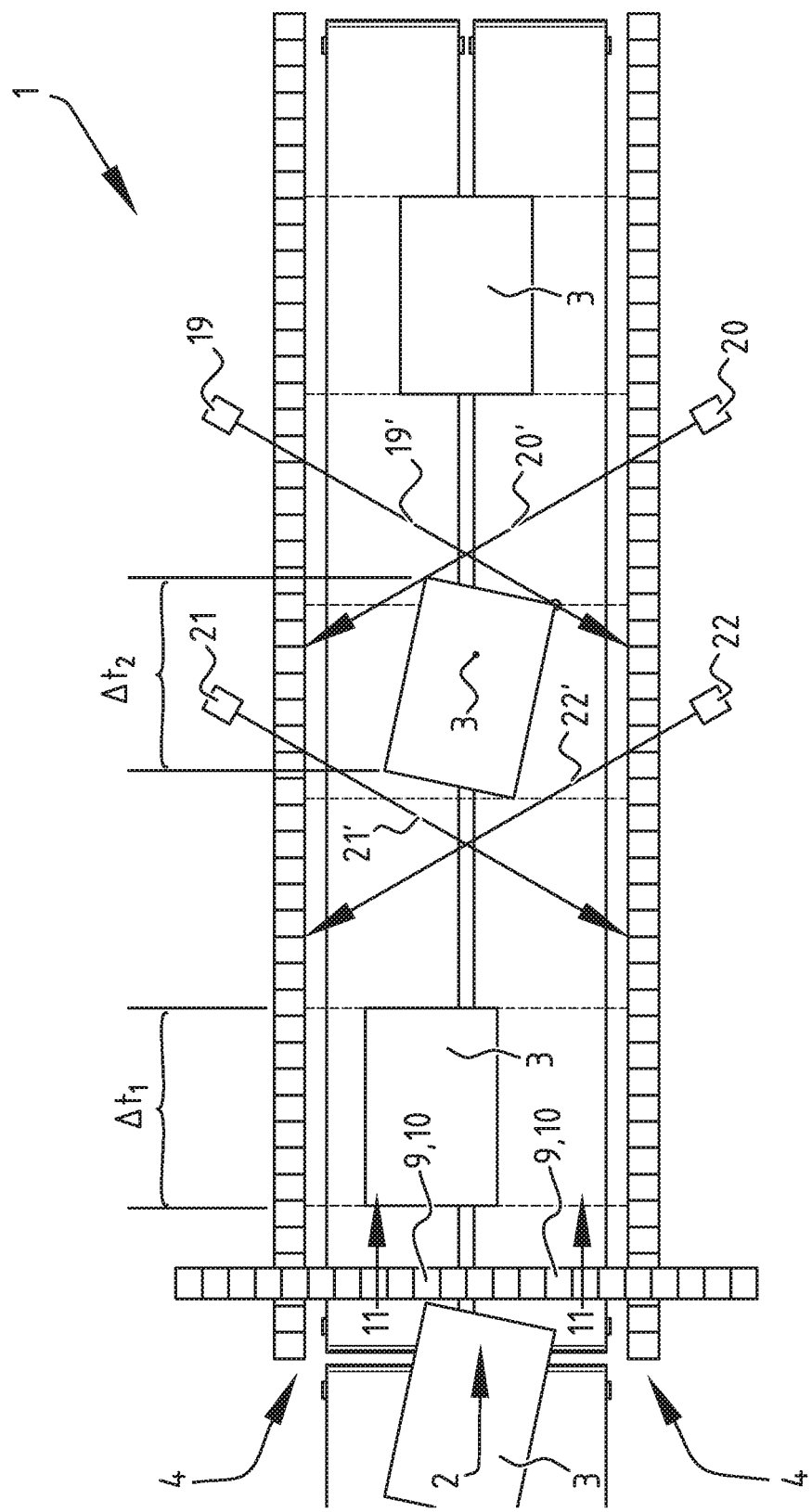

In FIGS. 1 and 2, a further meter 4' is arranged above the carrier 2 and transverse with respect to the direction of movement 11 of said conveyors 13, 15. This further meter 4' is also shown in FIG. 6, where it provides an alternative way to determine an oblique orientation of an object 3 on said carrier 2. When looking from above in downward direction towards the carrier 2, specific detectors 9, 10 of meter 4' will detect an object 3. If the object 3 is aligned with the moving direction 11 of said carrier 2, multiple detectors 9, 10 will more or less simultaneously detect the object 3 that approaches the detected area frontal. However, if the object 3 is misaligned—as shown in FIG. 6—the most forward-facing corner of said object 3 will be detected as first. In this way, the further meter 4' is able to distinguish between objects 3 that are aligned with the direction of movement 11 and objects 3 that are orientated oblique with respect to the direction of movement 11. Also, dependent on which corner of said object 3 is most forward-facing in the direction of movement 11, the controller 7 may decide which rotation is expected to result in the desired alignment in the most efficient manner.

The formation part 28 may be provided with even further meters 4" (FIG. 2) that are used to determine a position of an object 3 on the formation part 28. Using slides 30, the objects 3 may be shifted towards a desired position.

Also the layer buffer 29 may be provided with a further meters 4''' that are capable of determining a spacing between (rows of) objects 3 on said layer buffer 29 (FIG. 2).

Figure 4:
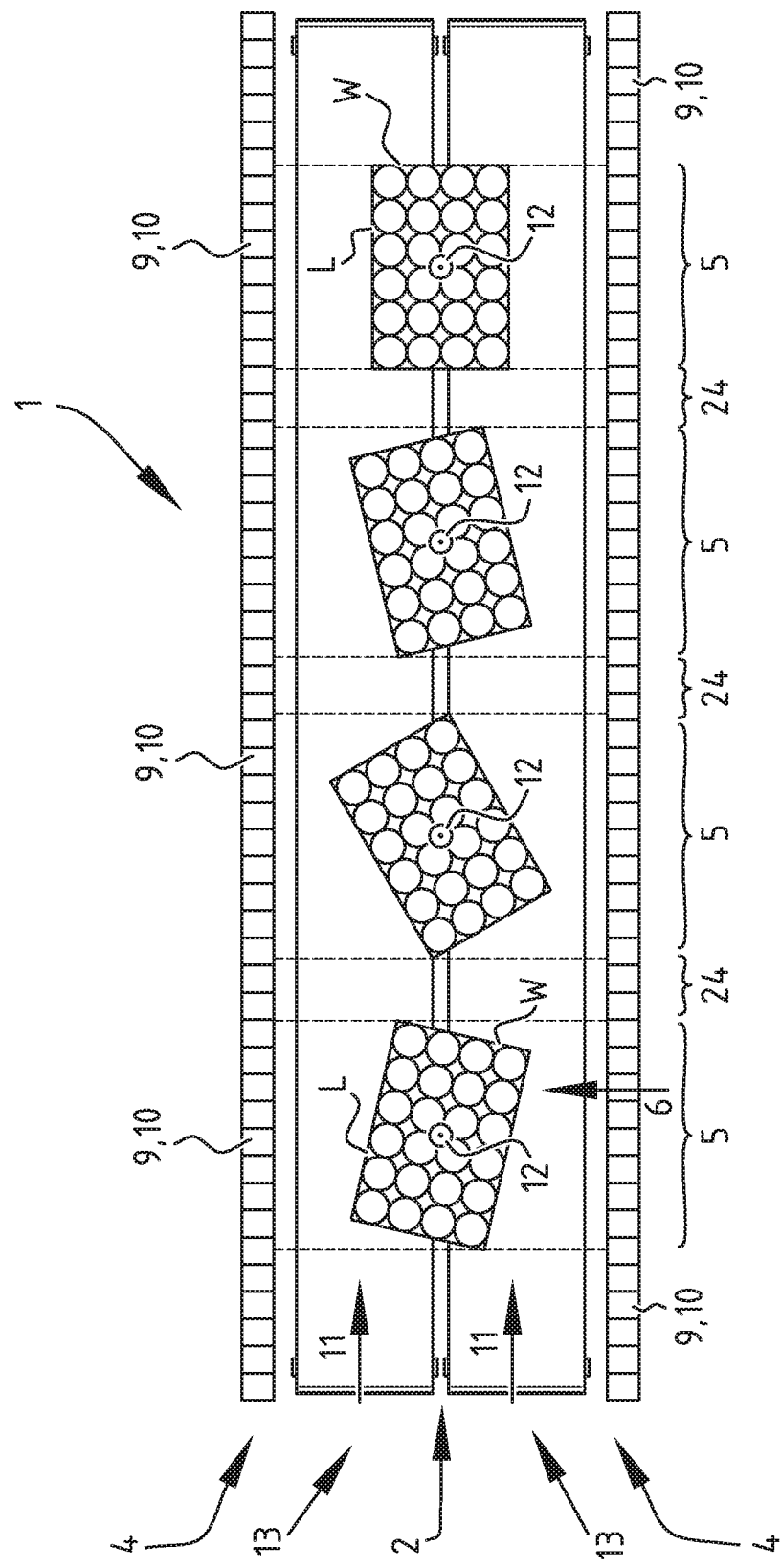
FIG. 4 is a schematic top view of the device according to FIG. 3, wherein objects are rotated around an upright axis line.

FIG. 4 shows the method steps of providing an object 3, measuring a dimension 5 of the object 3 relative to at least one direction 6, rotating the object 3 around an upright axis line 12, and determining a variation of the dimension 5 of the object 3, thereby aligning the object 3 in a desired orientation based on the determined variation. If a rectangular object 3 is aligned with a transport direction of carrier 2, the meter 4 that is arranged on the side of the carrier 2 in FIG. 3, will measure a dimension 5 of the object 3 that corresponds to the length L (shown) or width W of said object 3.

In the embodiments shown in FIGS. 1, 3-7, the carrier 2 comprises two parallel conveyors 13. Two parallel conveyors 13 are capable of functioning as a turning conveyor. The object 3 may be supported on the two parallel conveyors 13, and by causing a speed difference between the two parallel conveyors 13 the object may be rotated. If the two parallel conveyors 13 are driven in a same direction of movement 11 during rotating the object 3, the object 3 is rotated during a continuous forward transportation. Alternatively, it is also possible to rotate an object on a spot by driving the two parallel conveyors 13 in opposite directions.

Figure 7:
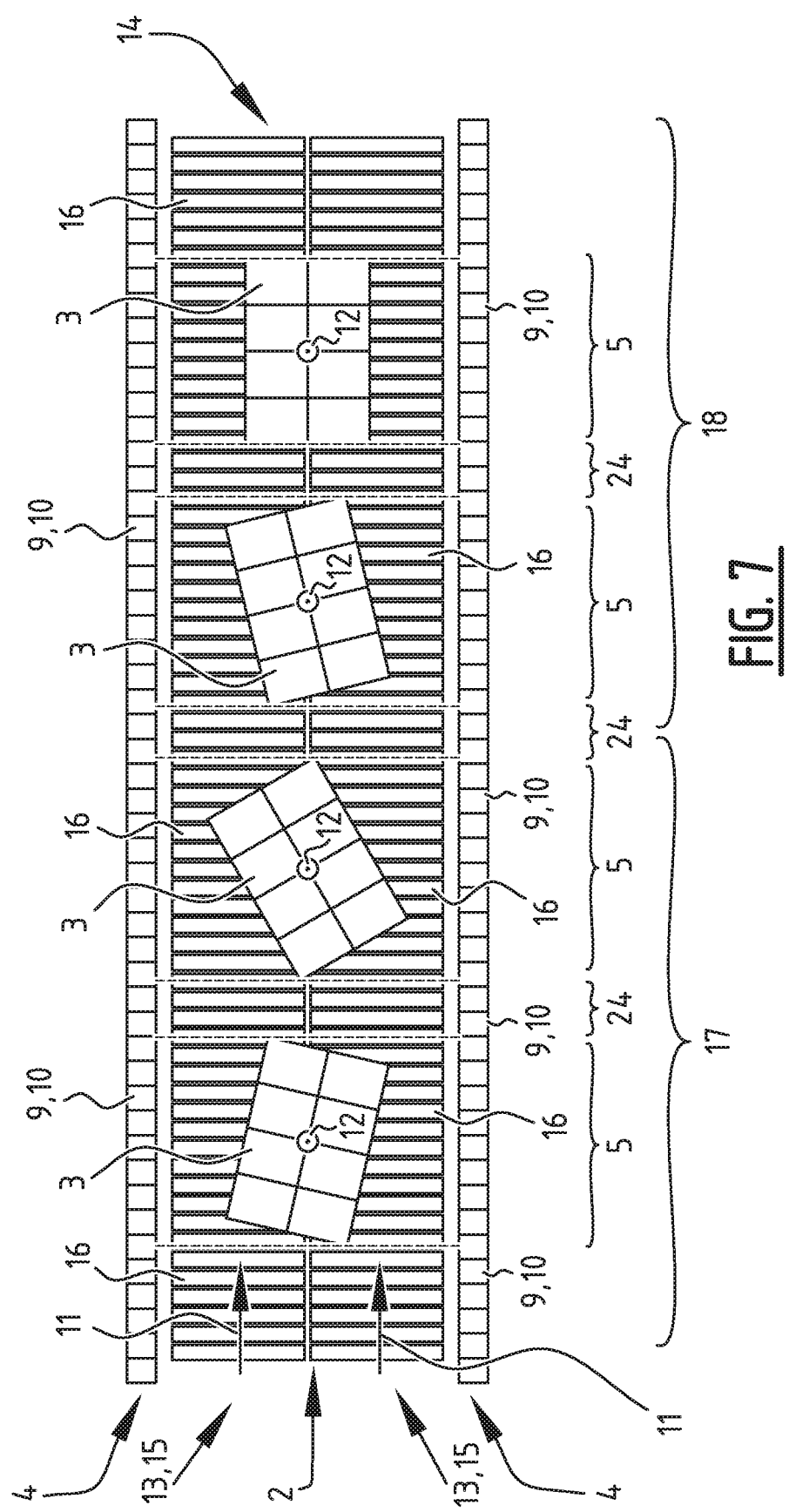
FIG. 7 is a top view of a further embodiment, wherein the carrier comprises a split roller conveyor.

The conveyors 13 may comprise a belt (FIGS. 3-6) or, preferably, comprise a split roller conveyor 14 (FIG. 7). A split roller conveyor 14 comprises two parallel tracks 15 of driven rollers 16. An advantage of a split roller conveyor 14 is that they may comprise at least two independently drivable sections 17, 18 that are arranged subsequently in-line, i.e. in a driving direction 11 of said conveyors 13. The meter 4 is preferably configured to measure a spacing 24 between successive objects 3, in which case the controller 7 is configured to adjust said spacing 24. Adjusting the spacing 24 between successive objects 3 may be performed by independently driving at least two drivable sections 17, 18 of said carrier 2 at a different speed. For example, when the upstream drivable section 17 moves at a slower speed than the downstream drivable section 18, the spacing 24 between successive objects 3 is increased.

The two parallel conveyors 13 may each comprise an inclination in a direction transverse to a direction of movement 11 of said conveyors 13, wherein the two parallel conveyors 13 together define a V-shape. Thus, the two parallel conveyors 13 together define V-shape, wherein each leg of the V is formed by one of the parallel conveyors 13. If a side of an object 3 facing the conveyors 13 is curved instead of substantially flat, the V-shape may increase the contact surface between the object 3 and the conveyors 13. In this way, also objects resting on curved sides thereof may be effectively rotated using the two parallel conveyors 13.

Preferably, the inclination of the two parallel conveyors 13 is adjustable. The controller 7 may adjust the level of inclination based on the measured dimension 5 of the object 3. The V-shape may facilitate an even distribution of the objects 3 over the two parallel conveyors 13. If an object 3 is distributed evenly, i.e. centered, on the two parallel conveyors 13, objects 3 may be rotated with a high level of accuracy. Also, for objects 3 resting with a curved surface thereof on the two parallel conveyors 13, the contact surface may be optimized by adjusting the level of inclination based on the curvature of the surface with which the object 3 is resting on the two parallel conveyors 13.

An optional (not shown) press may be provided that is configured to press the object 3, at least during rotating said object around the upright axis line thereof, on the two parallel conveyors 13. The press thus presses the object with a force oriented opposite the upright axis line 12. In this way, the press provides grip between the two parallel conveyors and the object 3, and thereby guarantees a reliable and accurate rotating action of said object 3.

The method comprises the step rotating the object 3 around an upright axis line 12, and determining a variation of the dimension 5 of the object 3 (FIG. 4). The method preferably further comprises the step of determining at least one minimum value of a dimension 5 of the object 3. This minimum value not necessarily corresponds to an absolute minimum, i.e. the smallest side (width W) of a rectangular object 3. During the process of rotating of e.g. a rectangular object 3, both the width W and the length L of said product will be measured as a minimum value during rotating. The method shown in FIG. 4 comprises rotating the object 3 around an upright axis line 10 until at least one minimum value is measured. Please note that the rightmost position of object 3 has a length L that is aligned with the transport direction 11 of said carrier 2. This length L is a dimension 5 that is less than the dimensions 5 of the other three objects 3, which are all oriented oblique on the carrier 2. Moreover, this length L is measured as a minimum value, since dimension 5 will grow if object 3 was rotated further and would become oblique relative to the transport direction 11 of said carrier 2.

The method may also comprise the steps of rotating the object 3 around an upright axis line 12, successively or continuously measuring a dimension 5 of the object 3 relative to at least one direction 6, and predicting at least one minimum value of said object. Rotating an object 3 will result in a periodic mathematical function from which the dimension of the object may be obtained by evaluating the minima, maxima and/or local minima of the function. For example, a square object that is rotated at a constant speed will result in a mathematical function with a sinusoidal form. For a rectangular object 3, a minimum of the periodic mathematical function will corresponds to a width, a maximum will correspond to a diagonal, and a local minimum will respond to a length of said rectangular object 3.

The shown method comprises the step of storing at least one minimum value of the object 3 in a memory.

In addition to determining and storing a minimum value of a dimension 5 of said object 3, the method may further comprise the step of determining a maximum value of a dimension 5 of the object 3. A rectangular object 3 will only have one maximum value that corresponds to a diagonal cross sectional distance through the object 3.

For determining such a maximum value, the method may comprise the step of rotating the object 3 around the upright axis line 12 until a maximum value is measured.

As an alternative for, or addition to measuring of the maximum value, the method may comprise the steps of rotating the object 3 around an upright axis line 12, successively or continuously measuring a dimension 5 of the object 3 relative to at least one direction 6, and predicting a maximum value of said object 3. This maximum value of the object 3 may be stored in a memory.

The method may comprise the step of determining the dimensions of said object 3 based on the determined at least one minimum value of the object and the determined maximum value of the object 3. Especially if the shape of the object 3 is known, the dimensions may be easily obtained. E.g. for a rectangular object 3, the dimension length L and width W may be easily derived from the measured values.

The method may further comprise checking if an actual orientation of said object corresponds to the desired orientation of said object by the steps of measuring a dimension of the object relative to at least one direction, and comparing said measured dimension with the determined at least one minimum value of said object. For a rectangular object 3, the minimum value will correspond to the length L or width W of said object 3. Based on the dimension 5 measured by meter 4, the device 1 is able to check if the length L or width W is aligned with the driving direction 11 of the carrier 2. If the dimension 5 measured by meter 4 differs from a minimum value, then it is known that the object 3 is positioned oblique instead of being aligned (as shown in left three positions of object 3 in FIGS. 4 and 7).

In order to align an object 3 that is oriented oblique, the method may comprise the step of rotating the object 3 around an upright axis line 12 until the measured dimension 5 of the object 3 corresponds to the determined at least one minimum value of said object 3.

As mentioned before, the variation of dimension 5 of a rectangular object 3 will follow a periodical path that may be used to predict a minimum or maximum value of said object 3. It is also conceivable that the dimensions of the object 3 are known, and the controller 7 may rotate the object 3 until the meter 4 measures a value corresponding to either a width W or length L of said object 3 that corresponds with the desired orientation of said object 3 on said carrier 2.

An improved accuracy may be obtained by the steps of rotating the object 3 around an upright axis line 12, and adjusting the rate of rotating the object 3 based on the difference between the measured dimension 5 of the object 3 and the at least one minimum value of said object. The method may thus real time adjust the rate of rotation based on the measured dimension 5 of the object 3. The at least one minimum value may be determined or known.

Figure 5:
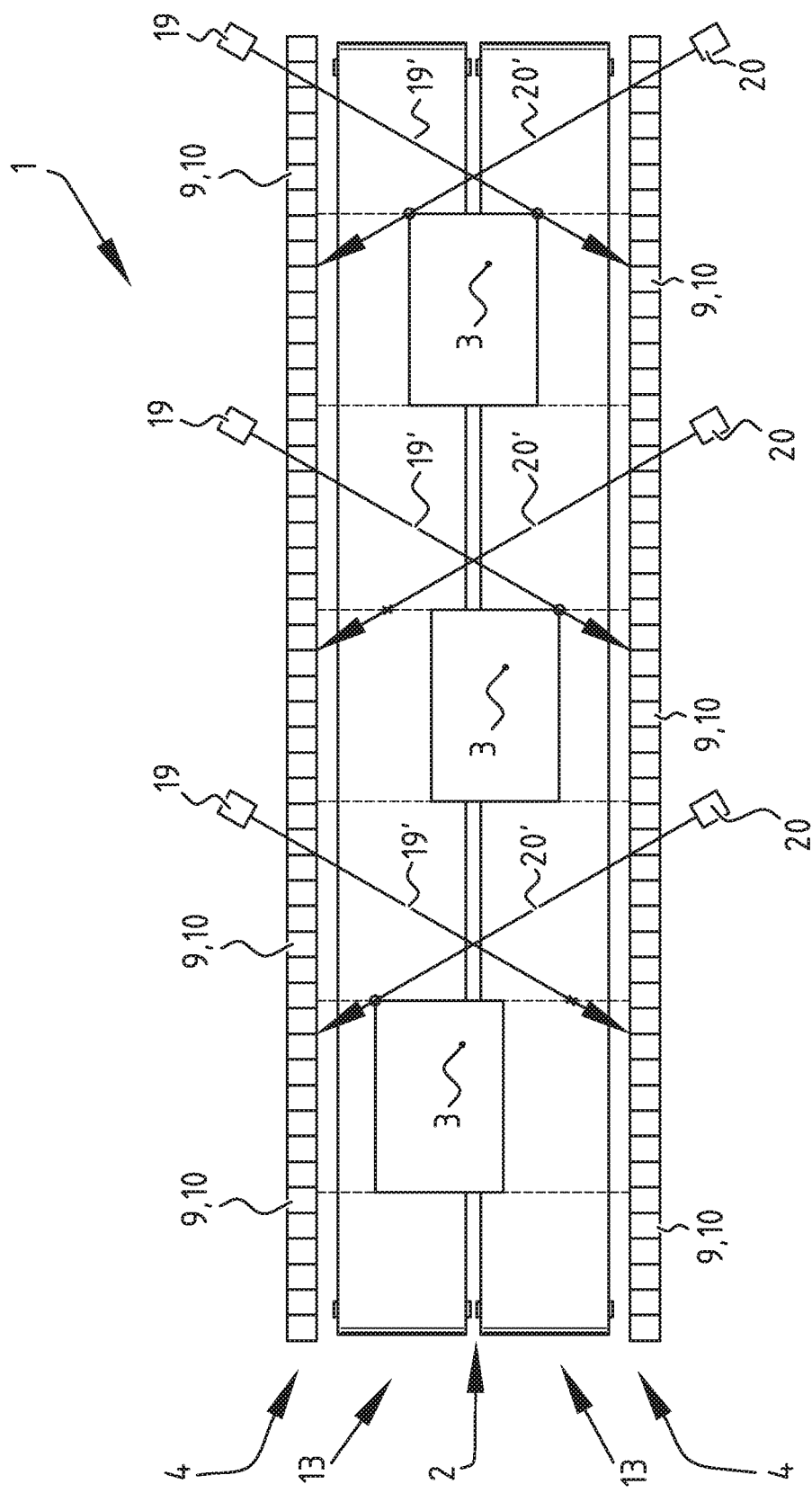
FIGS. 5 and 6 are schematic top views of the device according to FIGS. 3 and 4, wherein objects that are positioned off-centre on the carrier are detected.

In order to have a predictable and desired rotation of the object 3, it is desired that the object 3 is evenly distributed on the carrier 2, i.e. supported evenly by the two conveyors 13. In order to check if the object 3 is positioned evenly distributed, the device 1 may comprise a first detector 19 that is oriented oblique relative to a direction of movement 11 of the carrier 2, wherein the first detector 19 is arranged next to the carrier 2 (FIG. 5). If the dimensions of the object, e.g. length L and width W of a rectangular object 3 are known, first detector 19 suffices for checking if object 3 is positioned centered on carrier 2.

The centered positioning of an object 3 on carrier 2 may even more accurately be assessed with a device 1 further comprising a second detector 20 that is oriented oblique relative to a direction of movement of the carrier 2, wherein the first oblique detector 19 and the second oblique detector 20 are arranged on opposite sides next to the carrier 2. The method corresponding to this embodiment comprises determining if an object 3 is evenly distributed on the carrier 2 by comparing detector data of the first oblique detector 19 and the second oblique detector 20 that are both oriented oblique relative to a direction of movement 11 of the carrier 2, wherein the first oblique detector 19 and the second oblique detector 20 are arranged on opposite sides next to the carrier 2. If the first oblique detector 19 and second detector 20 detect the object 3 at substantially the same time, object 3 is substantially centered. If the difference in time between detection of the object 3 by the earliest of the first and second oblique detectors 19, 20 and by the latest of the first and second oblique detectors 19, 20 exceeds a certain predetermined threshold, than the object 3 is considered to be unevenly distributed. The controller 7 may cause an alarm and even stop the device 1 for manual interference by a human operator.

The above described ways of checking if the object 3 is centered on the carrier 2 presuppose that the dimensions of said object 3 are known, either in advance or determined/measured by the device 1. In that case, the sensors 10 of meter 4 may check if the measured dimension 5 corresponds to a known dimension 5 of said object 3 to check if the object 3 is aligned, i.e. not positioned oblique on carrier 2.

Also, if dimensions of the objects 3 are known in advance, the controller 7 may easily recognize if an object 3 with a deviating size or abnormal shape is provided on the carrier 2. If deviating objects 3 are not acceptable, the controller 7 may stop the process and alarm an operator. Abnormal shapes of an object 3 may also be caused by a dented object 3, which may thus be recognized by the device 1 according to the invention.

However, if the dimensions of the object 3 are not (yet) known, it is necessary to determine the alignment of said object 3 alternatively, because the dimension 5 measured by meter 4 cannot be compared with a known dimension of e.g. a length L or width W of the object 3. FIG. 6 shows a further embodiment of the device 1, which is capable to determine if an object 3 is positioned centered, i.e. evenly distributed on the carrier 2, without using the dimension 5 measured by meter 4. The device 1 in FIG. 6 further comprises at least a third detector 21 that is oriented oblique relative to a direction of movement 11 of the carrier 2, wherein the third detector 21 is arranged next to the carrier. The method corresponding to this embodiment comprises the step of comparing the measurement of the third detector 21 with the measurement of at least one of the first 19 and second oblique detector 20. The third oblique detector 21 is preferably compared with a detector arranged on the same side of the carrier 2.

In FIG. 6, also a fourth detector 22 is shown, which illustrates that the embodiment of FIG. 5 would also be capable of performing the method steps described using FIG. 6. By measuring the time difference between different oblique detectors 19, 20, 21, 22 an oblique orientation may be determined by controller 7. One of the first oblique detectors 19 or second oblique detectors 20 may function as a third oblique detector 21. A further oblique detector of the first oblique detectors 19 or second oblique detectors 20 may even function as a fourth oblique detector 22. The first oblique detector 19, second oblique detector 20, third oblique detector 21 and fourth oblique detector 22 have oblique measurement directions 19', 20', 21' and 22' respectively, and are preferably all integrated in meter 4. These oblique detectors 19, 20, 21, and 22 preferably comprise at least one detector from a group comprising at least one of a proximity sensor, a photo sensor, a video sensor, an ultrasonic sensor. If suitable sensors are used, they may function both as a detector to measure a dimension 5 of the object 3 relative to at least one measurement direction 6, and also as an oblique detector.

Optimization of the rate of rotating the objects 3 may be obtained by assessing how easy or difficult it is for the controller 7 to align the side surface of said object 3 substantially in line with the transport direction. If alignment is easily reached the controller may gradually increase the rate of rotating the objects 3. However, if alignment is relatively difficult to reach, the controller 7 may lower the rate of rotating the objects 3. In this way, the controller 7 will gradually optimize the step of rotating the object to align a side surface thereof substantially in line with a transport direction of said object. This optimization result in a stable and reliable alignment of objects, at the highest rate possible.

Figure 8:
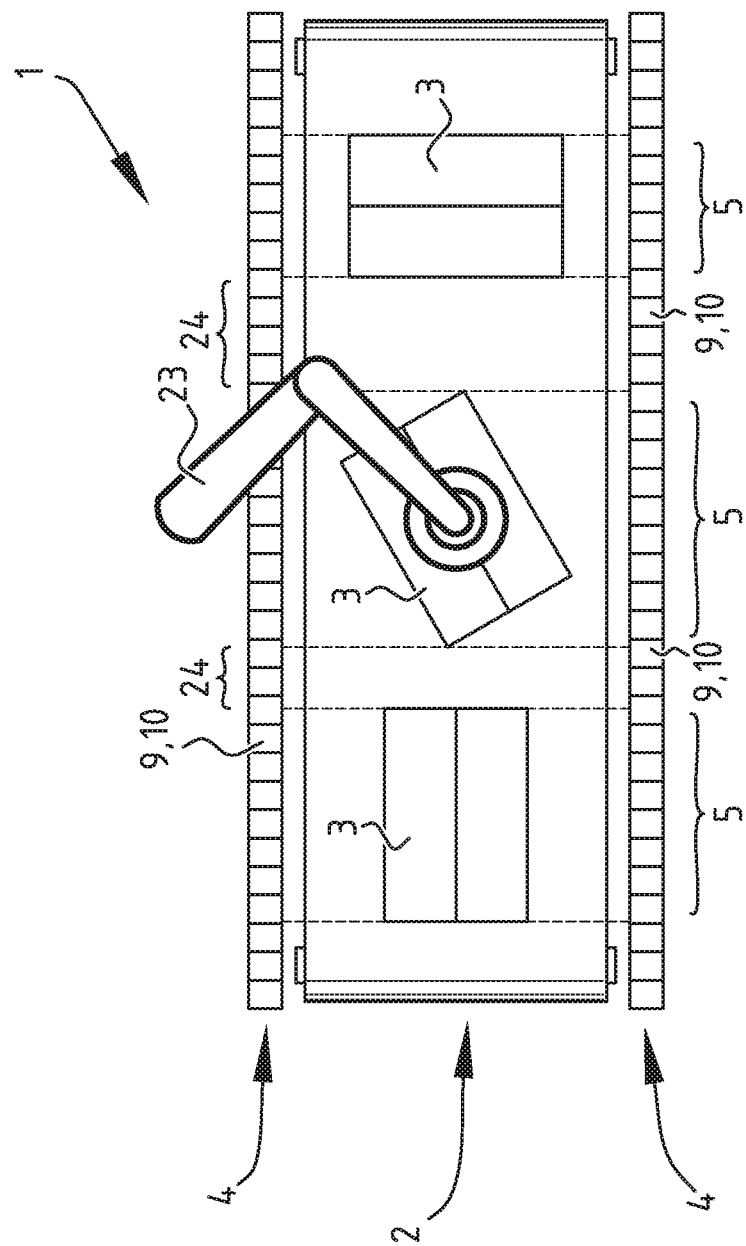
FIG. 8 is a top view of a further embodiment, comprising a robot.

The invention may be used on various types of carriers 2, such as conveyor belts using driveable roller sets or automated conveyance platforms using driveable rollers, or, as shown in FIG. 8, may comprise a robot 23 with a gripper to subsequently rotate the objects 3. A robot 23 may orientate an object 3 and simultaneously adjust a spacing 24 in addition to the spacing 24 already being influenced by the corrected orientation of said object 3.

The meter 4 is preferably configured to measure spaces between successive objects 3. Using information about the available distance between successive objects 3, the controller 7 may determine whether or not sufficient space is available to rotate an object 3 and bring it into the desired alignment thereof. It is however noted that this functionality of determining spaces may also be applied independently from aligning objects in a desired orientation, and may even be arranged in retrofit.

Measuring the spaces between successive objects 3 may also provide valuable information for the controller 7 that is not necessarily related to rotating the objects 3. For example, an occurring congestion may be recognized early, and the controller 7 may be configured to adjust the driving speed of the carrier 2 to mitigate the congestion before problems arise. As the latter is not necessarily related to rotating the objects 3, it may be applied independent of the capability to rotate the objects 3.

The controller 7 may be configured to be self-learning, so that an ever increasing efficiency of successively orientating and positioning objects 3 to form a customized pallet layer is obtained.

Although they show preferred embodiments of the invention, the above described embodiments are intended only to illustrate the invention and not to limit in any way the scope of the invention. Accordingly, it should be understood that where features mentioned in the appended claims are followed by reference signs, such signs are included solely for the purpose of enhancing the intelligibility of the claims and are in no way limiting on the scope of the claims. Furthermore, it is particularly noted that the skilled person can combine technical measures of the different embodiments. The scope of the invention is therefore defined solely by the following claims.

The invention claimed is:

1. A device, comprising:
   a carrier, wherein the carrier is an object carrier that is configured to subsequently carry and transport substantially rectangular objects in a transport direction, wherein the carrier comprises at least one of:
      at least two independently drivable sections that comprise two parallel conveyors;
      a conveyor belt using a driveable roller set;
      an automated conveyance platform using drivable rollers; and
      a robot with gripper to subsequently rotate the objects;
   a meter, wherein the meter is an object dimension meter configured to measure a dimension of the object relative to at least one direction wherein the meter is further an object spacing meter configured to measure a spacing between successive objects; and
   a controller configured to rotate at least one object and to further adjust said spacing, wherein the controller is an object rotation controller,
   wherein the object dimension meter comprises an array of sensors arranged in said transport direction along the carrier; and
   wherein the object rotation controller is configured to determine a variation of the dimension of the object and configured to control rotation of the object to align a side surface of said object substantially in line with the transport direction based on the determined variation of the dimension of the object.

2. The device according to claim 1, wherein the carrier comprises at least two independently drivable sections that comprise two parallel conveyors each comprising an inclination in a direction transverse to a direction of movement of said conveyors, and wherein at least one of: (a) the two parallel conveyors together define a V-shape and the inclination of the two parallel conveyors is adjustable, and (b) the two parallel conveyors comprise a split roller conveyor that comprise at least two independently driveable sections.

3. The device according to claim 1, wherein the carrier is configured to subsequently rotate the objects on the carrier, and wherein the controller is configured to control rotation of the object on the carrier.

4. The device according to claim 1, wherein the meter comprises at least one detector from a group comprising at least one of a proximity sensor, a photo sensor, a video sensor, and an ultrasonic sensor.

5. The device according to claim 1, wherein the measurement direction corresponds to at least one of a side, top, frontal, rear or oblique view.

6. The device according to claim 1, comprising a first oblique detector that is oriented oblique relative to a direction of movement of the carrier, wherein the first detector is arranged next to the carrier.

7. The device according to claim 6, further comprising a second oblique detector that is oriented oblique relative to a direction of movement of the carrier, wherein the first and second detectors are arranged on opposite sides next to the carrier.

8. The device according to claim 7, further comprising at least a third oblique detector that is oriented oblique relative to a direction of movement of the carrier, wherein the third oblique detector is arranged next to the carrier.

9. A method, comprising:
providing at least one object;
measuring a dimension of the object relative to at least one direction and further measuring a spacing between successive objects;
rotating at least one object around an upright axis line and also adjusting a spacing between successive objects,
measuring the dimension of the object with an object dimension meter that comprises an array of sensors arranged in a transport direction along the carrier; and
determining a variation of the dimension of the object;
wherein rotating the at least one object around the upright axis line comprises aligning a side surface of said object substantially in line with a transport direction of said object based on the determined variation.

10. The method according to claim 9, comprising determining at least one minimum value of a dimension of the object, and at least one of: (a) rotating the object around an upright axis line until at least one minimum value is measured, and (b) storing at least one minimum value of the object in a memory.

11. The method according to claim 10, comprising:
rotating the object around an upright axis line;
successively or continuously measuring a dimension of the object relative to at least one direction; and
predicting at least one minimum value of said object.

12. The method according to claim 11, comprising determining if an object is evenly distributed on the carrier by comparing detector data of a first and a second oblique detector that are both oriented oblique relative to a direction of movement of the carrier, wherein the first and second oblique detectors are arranged on opposite sides next to the carrier.

13. The method according to claim 11, comprising supporting the object on two parallel conveyors, and rotating the object by causing a speed difference between the two parallel conveyors, and comprising driving the two parallel conveyors in a same direction of movement during rotating the object.

14. The method according to claim 9, comprising determining a maximum value of a dimension of the object.

15. The method according to claim 14, comprising rotating the object around an upright axis line until a maximum value is measured.

16. The method according to claim 14, comprising:
rotating the object around an upright axis line;
successively or continuously measuring a dimension of the object relative to at least one direction; and
predicting a maximum value of said object.

17. The method according to claim 14, comprising storing the maximum value of the object in a memory.

18. The method according to claim 14, comprising checking if an actual orientation of said object corresponds to the desired orientation of said object by:
measuring a dimension of the object relative to at least one direction; and
comparing said measured dimension with the determined at least one minimum value of said object.

19. The method according to claim 18, comprising rotating the object around an upright axis line until the measured dimension of the object corresponds to the determined at least one minimum value of said object.

20. The method according to claim 18, comprising:
rotating the object around an upright axis line; and
adjusting the rate of rotating the object based on the difference between the measured dimension of the object and the at least one minimum value of said object.

* * * * *